US011223510B2

(12) United States Patent
Mao et al.

(10) Patent No.: US 11,223,510 B2
(45) Date of Patent: Jan. 11, 2022

(54) METHODS AND SYSTEMS FOR DYNAMIC DATA MANAGEMENT

(71) Applicant: Comcast Cable Communications, LLC, Philadelphia, PA (US)

(72) Inventors: Weidong Mao, West Windsor, NJ (US); Elad Nafshi, Bryn Mawr, PA (US); Mark Andrew Vickers, Marina del Rey, CA (US); Gregory Allen Broome, Broomfield, CO (US); Sree Kotay, Philadelphia, PA (US); Bruce Bradley, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 179 days.

(21) Appl. No.: 13/829,628

(22) Filed: Mar. 14, 2013

(65) Prior Publication Data

US 2014/0280688 A1  Sep. 18, 2014

(51) Int. Cl.
*H04L 29/08* (2006.01)
*H04L 29/06* (2006.01)
(Continued)

(52) U.S. Cl.
CPC .... *H04L 29/08549* (2013.01); *H04L 65/4084* (2013.01); *H04L 65/602* (2013.01); *H04L 65/80* (2013.01); *H04L 67/108* (2013.01); *H04L 67/1063* (2013.01); *H04L 67/1097* (2013.01); *H04L 67/2847* (2013.01); *H04L 67/2857* (2013.01); *H04N 21/23106* (2013.01); *H04N 21/23109* (2013.01); *H04N 21/23439* (2013.01); *H04N 21/44029* (2013.01)

(58) Field of Classification Search
CPC ........... H04L 29/08549; H04L 65/4084; H04L 65/602; H04L 65/80; H04L 67/2847; H04L 67/1063; H04L 67/108; H04L 67/2857; H04L 67/1097; H04N 21/23109; H04N 21/23439; H04N 21/44029; H04N 21/23106
See application file for complete search history.

(56) References Cited

U.S. PATENT DOCUMENTS

2003/0204602 A1\* 10/2003 Hudson ................... H04L 67/06
                                                                        709/228
2007/0294422 A1\* 12/2007 Zuckerman et al.
(Continued)

FOREIGN PATENT DOCUMENTS

WO   WO 2012/168356   12/2012

OTHER PUBLICATIONS

CA, 2845986, filed Mar. 14, 2013, Mao (Comcast Corp.).
(Continued)

*Primary Examiner* — Soe Hlaing
(74) *Attorney, Agent, or Firm* — Ballard Spahr LLP

(57) ABSTRACT

Methods and systems for managing data are disclosed. One method can comprise storing first data locally relative to a user device and storing second data remotely relative to the user device. The first data and the second data can relate to the same content. The method can also comprise generating a manifest comprising location information relating to the first data and the second data and receiving a request for transmission of one or more of the first data and the second data based upon the manifest.

20 Claims, 7 Drawing Sheets

(51) Int. Cl.
    *H04N 21/231*     (2011.01)
    *H04N 21/4402*    (2011.01)
    *H04N 21/2343*    (2011.01)

(56)         References Cited

U.S. PATENT DOCUMENTS

| | | | |
|---|---|---|---|
| 2010/0180044 A1* | 7/2010 | Olsson | H04L 65/60 |
| | | | 709/231 |
| 2010/0235528 A1* | 9/2010 | Bocharov et al. | |
| 2011/0072075 A1* | 3/2011 | Gautier | H04L 12/1881 |
| | | | 709/203 |
| 2011/0082914 A1* | 4/2011 | Robert | H04N 21/4788 |
| | | | 709/219 |
| 2011/0082924 A1 | 4/2011 | Gopalakrishnan | |
| 2011/0087842 A1* | 4/2011 | Lu | G06F 17/30867 |
| | | | 711/126 |
| 2012/0047542 A1 | 2/2012 | Lewis | |
| 2014/0040498 A1* | 2/2014 | Oyman | H04W 76/048 |
| | | | 709/231 |
| 2014/0067898 A1* | 3/2014 | Steiner | H04N 21/23439 |
| | | | 709/201 |
| 2014/0250230 A1* | 9/2014 | Brueck | H04L 67/18 |
| | | | 709/226 |
| 2014/0304377 A1* | 10/2014 | Andersson | H04L 65/4084 |
| | | | 709/219 |

OTHER PUBLICATIONS

EP, 2779576, filed Mar. 14, 2013, Mao (Comcast Corp.).
Extended European Search Report dated Jun. 13, 2014 for European Application No. 14160028, which was filed Mar. 14, 2013 and will be published Sep. 17, 2014 (Applicant: Comcast Corp.// Inventor: Mao (6 pages).

* cited by examiner

| Fragment Identifier | Resolution/bitrate profile | Locations | Cost Function |
|---|---|---|---|
| 1 | 720p60-5mbps | URL1a | C1a |
| 1 | 720p60-5mbps | URL1b | C1b |
| 2 | 720p30-3mbps | URL2 | C2 |

METHODS AND SYSTEMS FOR DYNAMIC DATA MANAGEMENT

BACKGROUND

Various factors can affect the speed and quality of content transmission and resultant content consumption. As an example, bandwidth limitations on a network can restrict the transmission rate of data, thereby limiting the transmission of larger, high definition data segments or files. As another example, local storage or buffer limitations on a user device can limit the amount of data the user device can receive for local processing. This disclosure addresses such and other shortcomings related to control of content delivery.

SUMMARY

It is to be understood that both the following summary and the following detailed description are exemplary and explanatory only and are not restrictive, as claimed. In some aspects, provided are methods and systems for controlling data such as content transmitted to one or more user devices. Provided are methods and systems for, in another aspect, dynamically managing data, such as content presented via one or more user devices. In an aspect, the methods and systems of the present disclosure can enable playback of content at maximum quality level by dynamically managing a source of the content. In another aspect, the methods and systems can enable the selection of optimal location and bitrate profiles of fragment delivery based on one or more of network bandwidth, storage capacity, priority of content and recipient device characteristics, for example.

In an aspect, the methods can comprise storing first data locally relative to a user device and storing second data remotely relative to the user device. As an example, the first data and the second data can relate to the same content. A manifest can be generated comprising location information relating to the first data and the second data. A request for transmission of one or more of the first data and the second data can be received based upon the manifest. The requested one or more of the first data and the second data can be located based upon the manifest and transmitted to the requesting device.

In another aspect, the methods can comprise transmitting first data to a first storage medium based upon a first condition. Second data can be transmitted to a second storage medium based on a second condition. A manifest can be generated comprising location information relating to the first data and the second data, and the first and second data can relate to the same item of content. A request for transmission of one or more of the first data and the second data can be received and/or assembled based upon the manifest. The requested one or more of the first data and the second data can be located based upon the manifest and transmitted to the requesting device.

In a further aspect, the methods can comprise receiving a manifest at a user device. The manifest can comprise location information relating to a first data stored relative to the user device. The manifest can comprise location information relating to a second data stored remotely relative to the user device. A parameter relating to the user device can be determined. A request for transmission of one or more of the first data and the second data can be received based upon one or more of the manifest and the determined parameter. The requested one or more of the first data and the second data can be located based upon the manifest and transmitted to the requesting device. The manifest file can be dynamically updated as the locations of multiple content fragments, and different versions thereof, change, such as when content fragments are pre-positioned or cached in the various remote or local storage locations.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
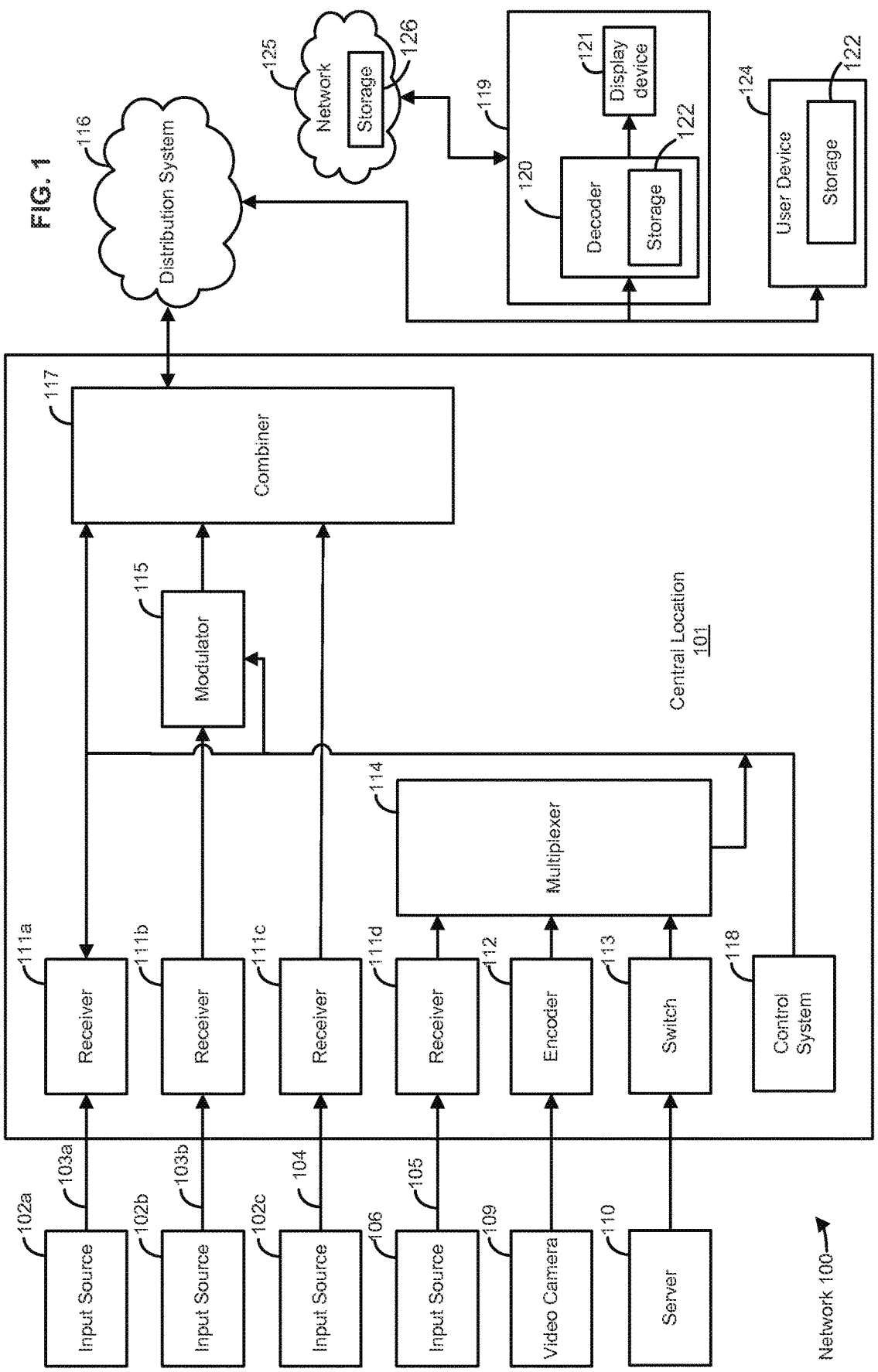
FIG. 1 is a block diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps, "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirety software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, systems and methods can relate to managing data based upon a manifest such as a dynamic manifest file. The manifest can comprise identifiers associated with one or more content assets such as videos, fragments, data blocks, and the like. In an aspect, the manifest can comprise information relating to the content assets such as location, bitrate, resolution, cost function and the like. In another aspect, the manifest can comprise information relating to various quality level (bitrate and resolution) content fragments located at network storage or local device storage or a combination thereof. When the location of one or more of the data segments is changed, the manifest can be modified to reflect the updated location of the data segments. When an identifier, cost function, parameter, or other characteristic relating to one or more data segments is changes, the manifest can be automatically updated to reflect the change. In another aspect, a device, such as a user device, can receive the manifest and can dynamically request particular data to be received. Transmission of any combination of various data segments having varying quality level and network/local storage location can be facilitated on a segment to segment basis based on the manifest. As an example, when conditions such as a network limitations do not allow efficient transmissions of high definition video from a first location over a network, the device can request an alternate version of the high definition video from a second location based upon the manifest.

In an aspect, FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming) from multiple sources. The central location 101 can combine the content from the various sources and can distribute the content to user locations, such as location 119, via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content can also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/ transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115a for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the decoder 120 can receive and process embedded markers, flags, and signals in the content data stream for controlling content received by the decoder 120.

In an aspect, the decoder 120 or communication terminal can comprise a storage medium 122. As an example, the storage medium 122 can comprise a memory or a storage device. As a further example, a number of content fragments can be loaded into the storage medium 122 and stored thr playback or processing by the associated decoder 120. However, other data, content, and/or information can be stored in the storage medium 122 such as advertisements and alternative content, for example. In an aspect, the storage medium 122 can be separate from the decoder 120. For example, the storage medium 122 can be located upstream of the decoder 120 and downstream of the distribution system 116. As a further example, the storage medium 122 can store information to be transmitted to any number of decoders 120 or other recipient devices. Accordingly, the decoder 120 can retrieve the content fragments from the storage medium 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating audio or visual feedback, tactile feedback, and the like. However, other content can be rendered via the user device 124. In an aspect, the user device 124 can be a CT, a set-top box, a television, a computer, a hone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used, h is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as network storage medium 126.

In an aspect, to manage the data transmitted to one or more of the decoder 120, the user device 124, and/or other device, a manifest (e.g., dynamic manifest file, metadata, etc.) can be generated as an index of data stored in one or more locations and/or in one or more storage mediums. In another aspect, the manifest can comprise the locations of various quality level (e.g., bitrate, resolution, etc.) content fragments located at network storage or local device storage or combination thereof. Local storage relative to a device can comprise storage that is integrated with the device, located within a pre-defined proximity, coupled via a first network such as a local network, located at the same premises as the device, or the like. Remote storage relative to a device can comprise storage that is located beyond a pre-defined proximity, located outside a premises of the device, and/or requires transmission of data over a second network such as the Internet or a wide area network. As an example, a device can receive the manifest and can dynamically request particular data to be received from one or more locations, data sources, and/or storage devices. Transmission of any combination of various data segments having varying quality level and network/local storage location can be facilitated on a segment by segment basis.

Figure 2:
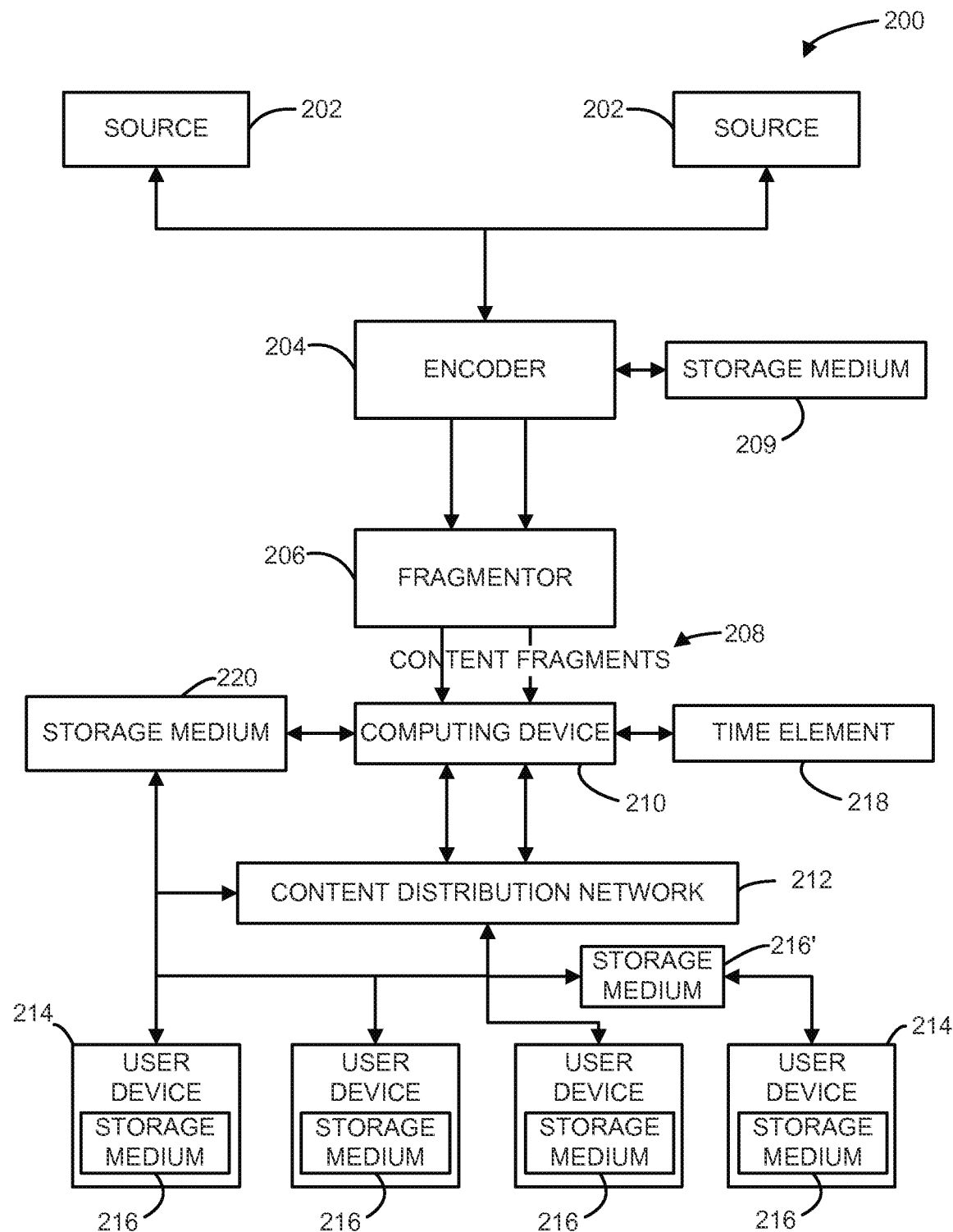
FIG. 2 is a block diagram of an example system architecture.

FIG. 2 is a block diagram of an example system 200. The system 200 can comprise one or more data sources 202 for accessing and/or transmitting data, such as a data stream. An encoder 204 can be in signal communication with the data source 202, A fragmentor 206 can be in signal communication with the encoder 204. As an example, the encoder 204 and the fragmentor 206 can be integrated as part of a unitary device. However, the encoder 204 and the fragmentor 206 can be separate and distinct components.

In an aspect, the data sources 202 can comprise a content provider for providing one or more of audio content, video content, data, news feeds, sports programming, advertisements, and the like. As an example, the data sources 202 can be configured to transmit the data (e.g., as a stream, fragments, files, etc.) to various end-users. In an aspect, one or more data sources 202 can comprise a content database having a plurality of advertisements, content assets, and the like stored therein or capable of accessing advertisement stored elsewhere. As an example, the advertisement database can comprise a plurality of video advertisements. As a further example, the plurality of advertisements can each have a particular time duration associated therewith. In an aspect, the time duration associated with the advertisements or alternate content can be varied in duration for application in various time dependent circumstances.

As an example, one or more of the data sources 202 can comprise a network data feed transmitting the data stream to users such as subscribers or clients. As a further example, the one or more data sources 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate and resolution to an output of multiple (lower) bitrates and resolutions. As an example, the encoder 204 can convert the data stream from the input format received from the data source (such as MPEG-2, QAM, etc.) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data sources 202 and encode/transcode information onto the data stream. In an exemplary embodiment, the encoder 204 can be configured to add information to the data stream relating to content fragments 208 or data blocks. In an aspect, a buffer or storage medium 209 can be in communication with the encoder 204 or integrated therewith. As an example, data received by the encoder 204 can be buffered or stored in the storage medium 209.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a computing device 210 through a content distribution network 212 to user devices 214 (e.g., the decoder 120). In an aspect, the computing device 210 can be an origin Hypertext Transfer Protocol (HTTP) computing device. However, other computing devices can be used, such as a rate adaptive streaming server. As an example, the fragmentor 206 can communicate with the computing device 210 using the POST method of the HTTP. As a further example, the computing device 210 can implement the functions described relative to the encoder 204 and/or the fragmentor. However, other protocols, configurations, and communication methods can be used.

In an aspect, the fragmentor 206 can separate or fragment the data stream into each of the content fragments 208 represented by the data stream based upon information encoded in the data stream by the encoder 204. In another aspect, the fragmentor 206 accesses the information encoded/inserted in the data stream by the encoder 204 to define the content fragments 208 based on, among other things, boundaries, grouping, timing, or duration. Once the content fragments 208 are generated, the content fragments 208 can be transmitted to the content distribution network (CDN) 212 for delivery to the user devices 214 for consumption (e.g., playback). As an example, the computing device 210, CDN 212, and the user devices 214 can intercommunicate using the GET method of HTTP. However, other protocols and communication methods can be used.

In an aspect, one or more of the user devices 214 can comprise a storage medium 216 such as a buffer or storage device. As an example, the storage medium 216 can comprise a memory or a storage device. As a further example, a number of the content fragments 208 can be loaded into the storage medium 216 and stored for playback by the associated user device 214. Accordingly, the user device 214 can retrieve the content fragments 208 from the storage medium 216 for playback without having to communicate with the CDN 212, thereby reducing latency and network bandwidth and storage/cache resources required to deliver these content fragments 208 from the CDN 212. The content fragments 208 can comprise audio, video, or other data from the computing device 210 with a regular cadence (e.g., every two seconds, four seconds, ten seconds). Other data, content, and/or information can be stored in the storage medium 216 such as advertisements and alternative content, for example.

In an aspect, a storage medium 216' can be separate from the user device 214. For example, the storage medium 216' can be located upstream of the user device 214 and downstream of the CDN 212, such as in a home gateway device. As a further example, the storage medium 216' can store information to be transmitted to any number of user devices 214 or other recipient devices. Accordingly, the user device 214 can retrieve the content fragments 208 from the storage medium 216' for playback without having to communicate with the CDN 212, thereby reducing latency in playback as well as preserving network bandwidth and storage/cache resources. In an aspect, the content fragments 208 can be retrieved from storage medium 216 and storage medium 216' simultaneously or in various sequences.

In an aspect, a time element 218 can be in communication with one or more of the encoder 204, the fragmentor 206, and the computing device 210 to provide a timing reference thereto. As an example, the time element 218 can be a clock. As a further example, the time element 218 can transmit information to one or more of the encoder 204, the fragmentor 206, and the computing device 210 for associating a time stamp with a particular event received by one or more of the encoder 204, the fragmentor 206, and the computing device 210. In an aspect, one or more of the encoder 204, the fragmentor 206, and the computing device 210 can cooperate with the time element 218 to associate a time stamp with events having an effect on the content delivered to the user devices 214, such as, for example, content or data request, content or data download, a channel tune, a remote tune, remote control events, playpoint audits, playback events, program events including a program start time and/or end time and/or a commercial/intermission time, and/or playlist timing events, and the like.

As an example, a storage device 220 can be in communication with one or more of the user device 214 and the computing device 210 to send/receive data such as content and/or index information such as a manifest therebetween. As a further example, the storage device 220 can be located remotely from the user device 214, such as a network storage medium. In an aspect, to manage the data transmitted to one or more of the user devices 214, and/or other devices, a manifest can be generated as an index of data stored in one or more locations and/or in one or more storage mediums. In another aspect, the manifest can comprise the locations of various quality level (bitrate and resolution) content fragments 208 located at network storage or local device storage or combination thereof. As an example, a device can receive the manifest and can dynamically request particular data to be received. Transmission of any combination various content fragments 208 having varying quality level and network/local storage location can be facilitated on the fragment by fragment basis using the manifest. For example, if bandwidth is limited, a lower resolution content fragment 208 can be requested. As a further example, the manifest can comprise location information relating to the storage location of the requested content fragment 208. Accordingly, the content fragment 208 can be requested from an appropriate location. The manifest can be updated on a fragment by fragment basis by a CDN, storage medium, home gateway, or user device, or a combination thereof. As an example, a device can monitor and/or receive information relating to one or more fragments and can update the manifest to reflect the information (e.g., changes or updates).

In an aspect, the manifest can provide location information that can be processed by a device to facilitate locating and/or requesting particular data segments from one or more of a plurality of sources. In an example, lower quality level data segments can be downloaded to a device to enable faster download and require less local storage. Upon playback, when connected to a network, higher quality level data segments can be streamed to the device if there is enough network bandwidth. In another example, higher quality level segments can be downloaded to a device when network bandwidth and local storage are available. If device executes playback from a network with limited bandwidth, lower quality segments can be streamed from network, while higher quality segments can be loaded from a local device storage.

In an aspect, provided are methods and systems for controlling content transmitted to one or more devices. In an aspect, one or more devices can request one or more data blocks from a content source, origin server, streaming server, rate adaptive server, local storage, remote storage, network storage, or the like.

Figures 3, 4:
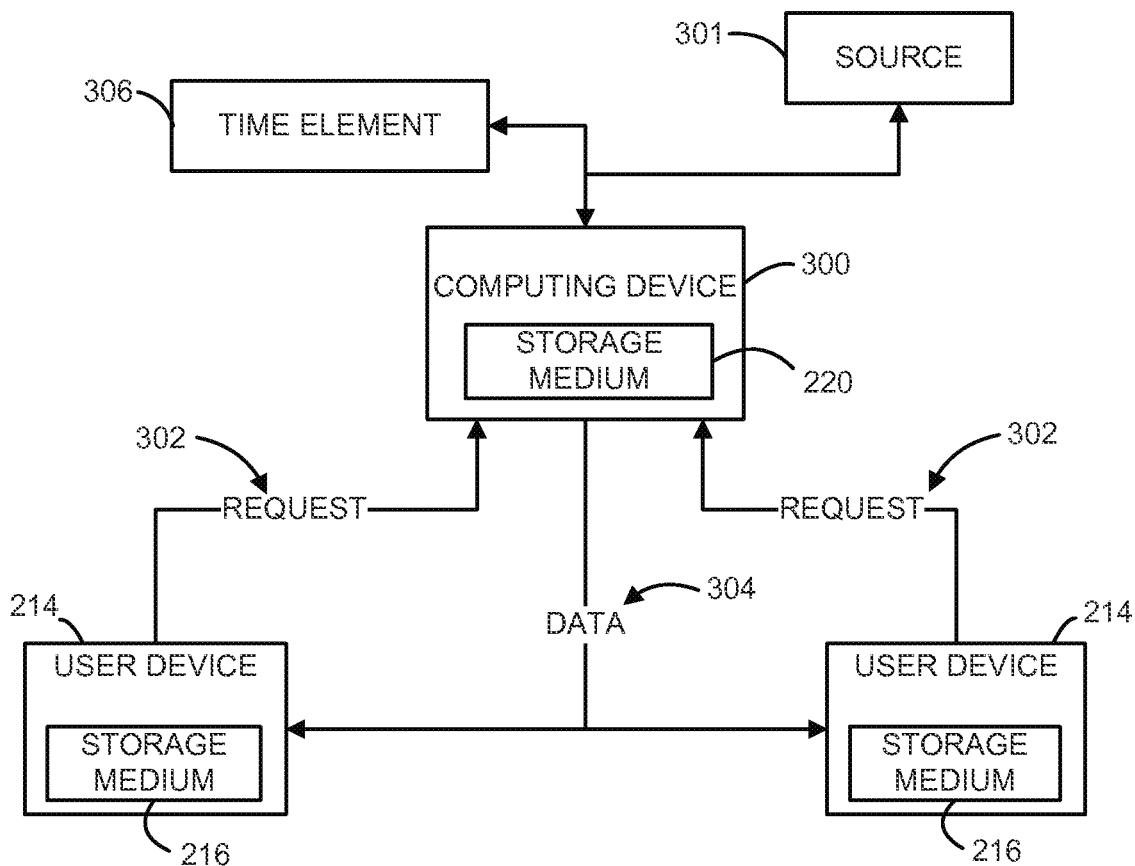
FIG. 3 is a block diagram of an example system architecture.
FIG. 4 is a representation of an example manifest.

FIG. 3 is a block diagram of an example system. In an aspect, a computing device 300 (e.g., origin server, streaming server, etc) can be in communication with one or more of the user devices 214. In an aspect, the computing device 300 can be in communication with one or more data sources 301 and/or content providers. As an example, the computing device 300 can be configured to manage the storage and/or transmission of data, such as data blocks, data segments, and content fragments transmitted to one or more of the user devices 214. Data can be stored in various storage mediums such as storage medium 216 and/or storage medium 220. In another aspect, the computing device 300 can log and/or analyze one or more data or content requests 302 received from one or more of the user devices 214 or other devices. As an example, the data requests 302 can be based upon a manifest.

In an aspect, the computing device 300 can be configured to generate a manifest, FIG. 4 illustrates an example manifest. The manifest can comprise identifiers associated with one or more content assets such as videos, fragments, data blocks, and the like. In an aspect, the manifest can comprise information relating to the content assets such as location, bitrate, resolution, cost function and the like. In another aspect, the manifest can comprise information relating to various quality level (bitrate and resolution) content fragments located at network storage or local device storage or a combination thereof. When the location of one or more of the data segments is changed, the manifest can be modified to reflect the updated location of the data segments. As an example, a device, such as computing device 300, can be configured to monitor locations of one or more data segments or items can automatically update the manifest file to reflect and up-to-date location of the data segments. As a further example, information relating to the location of the data segments can be accessed or received by any device, such as a storage device, and transmitted to the computing device 300 for updating the manifest file.

In an aspect, a device, such as a user device, can receive the manifest and can dynamically request particular data to be received. Transmission of any combination of various data segments having varying quality level and network/local storage location can be facilitated on a segment by segment basis based on the manifest. As an example, when conditions such as a network limitations do not allow efficient transmissions of high definition video from a first location over a network, the device can request an alternate version of the high definition video from a second location, or a group of locations, based upon the manifest.

In an aspect, the computing device 300 can monitor the condition of network bandwidth and storage/cache resource continuously based on the timestamp determined by timing element 306, for example. In another aspect, the computing device 300 can calculate, for example based on a predetermined algorithm, a cost function for delivering each fragment from each corresponding location to the user device 214. For example, the cost function can be a function relating to network bandwidth, storage size and/or throughput, priority, quality of service (QoS), on-net or off-net state, type of user device, size of the content, etc., or a combination thereof. As a further example, the cost function can relate to a user device profile comprising user device characteristics, such as display resolution and bitrate. Other information can be represented by the manifest.

Returning to FIG. 3, a time element 306 can be in communication with the computing device 300 to provide a timing reference thereto. As an example, the time element 306 can be a clock. As a further example, the time element 306 can transmit information to the computing device 300 for associating a time stamp with a particular event received by of the computing device 300. In an aspect, the computing device 300 can cooperate with the time element 306 to associate a time stamp with events having an effect on the content delivered to the user devices 214. As an example, events can comprise data or content requests 302, content or data delivery or download, a channel tune, a remote tune, remote control events, playpoint audits, playback events, program events including a program start time and/or end time and/or a commercial/intermission time, and/or playlist timing events, and the like.

In an aspect, computing device 300 can determine whether particular data blocks 304 (e.g., content block, special content block, advertisement, blackout screen, alternative programming content, etc.) should be transmitted to one or more of the user devices 214. As an example, the data blocks 304 can be transmitted directly to the user device 214 from the content source 301. However, the data blocks 304 can be routed through a network. As a further example, the data blocks 304 can be retrieved directly from a computing device such as the computing device 300. In an aspect, data blocks 304 can be spliced into the content fragments received at the user device 214 based upon an instruction from the computing device 300. As an example, the computing device 300 can be a rate adaptive computing device and can encode the requested data blocks 304 into fragments. Each fragment can be encoded based on one or more profile settings for recipient devices, users, and/or content players. Each fragment can comprise an encoding rate and fragment duration. In an aspect, two or more data blocks and/or fragments can relate to the same content asset. As an example, multiple versions (e.g., having different characteristics, such as bit rate, format, resolution, cost function, etc.) of the same content asset can be generated. As a further example, the versions of the content asset can be stored in various portion of a network or system. In an aspect, a manifest can be generated to represent a clearinghouse of information relating to the versions of the content asset stored in various locations.

Figure 5:
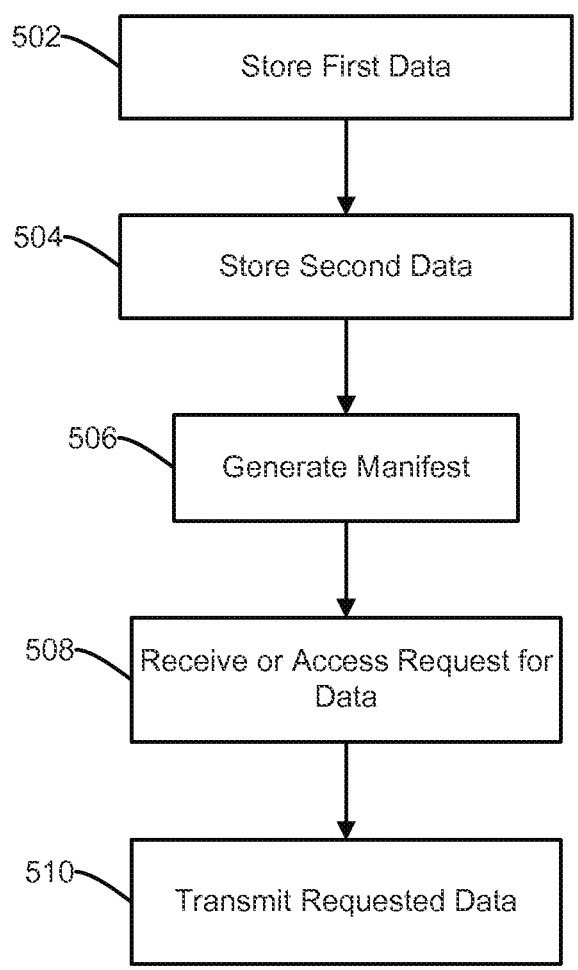
FIG. 5 is a flow chart of an example method.

FIG. 5 illustrates an example method. In step 502, first data can be stored. First data can comprise a data asset such as content, content fragments, content segments, or the like. In an aspect, the first data can be stored locally relative to a device such as a user device. As an example, storing data locally can comprise storing data on storage medium disposed locally relative to the user device. Locally disposed can comprise integrated with the user device, located at the same premises, coupled via a local network, or the like.

In step 504, second data can be stored. Second data can comprise a data asset such as content, content fragments, content segments, or the like. In an aspect, the second data can be stored remotely relative to the device. As an example, the first data and the second data relate to the same content. As a further example, storing second data remotely can comprise storing the second data on a network device. Remotely disposed can comprise separated from the user device, located outside a premises housing the user device, coupled via a wide area network, or the like.

In an aspect, one or more of the first data and the second data can comprise content fragments. As an example, one or more of the first data and the second data can comprise, or have associated therewith, a bit rate, a resolution, or a combination thereof. As another example, the first data can comprise a bit rate that is different from a bit rate of the second data. As a further example, the first data can comprise a resolution that is different from a resolution of the second data. In another aspect, the first data and the second data can relate to the same content asset. As an example, the first data can relate to a first version of a content asset, while the second data relates to a second version of the same content asset. As a further example, a high definition version of a content asset may be stored on a network. However, when access to the network is not available, a device can still playback a locally stored standard definition version of the same content asset. In another aspect, the first data and second data can be stored in any location on a system or network. As an example, the first data can be stored and/or accessed via a first communication channel, while the second data can be stored and/or accessed via a second communication channel.

In step 506, a manifest can be generated (e.g., created, populated, retrieved, updated, etc.). In an aspect, the manifest can comprise location information. As an example, the location information can relate to one or more of the first data and the second data. As a further example, the location information can relate to a storage location of one or more of the first data and the second data.

In step 508, a request for data can be accessed or received. In an aspect, the request for data can comprise a request for transmission of one or more of the first data and the second data. As an example, the request for data can be based upon the manifest. As another example, the manifest can be used to assemble compile, build, provide, sequence, etc.) a content asset based on the data requested. As a further example, the request for data can comprise requesting data from a particular location, such as a location comprised in the manifest. In another aspect, the manifest can be transmitted to a particular device, wherein the request for transmission is received from the particular device. In step 510, the requested data can be transmitted. In an aspect, the requested data can be transmitted to the requesting device.

Figure 6:
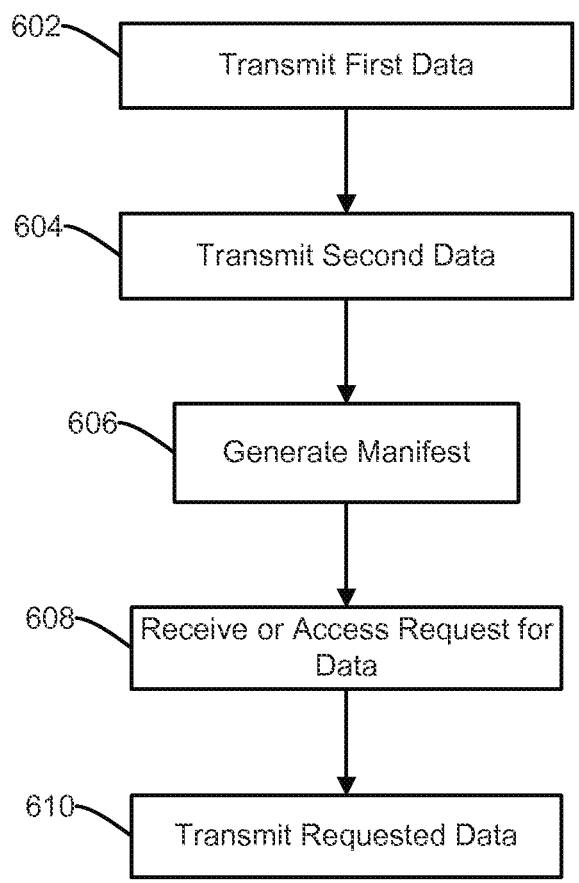
FIG. 6 is a flow chart of an example method.

FIG. 6 illustrates an exemplary method. In step 602, first data can be transmitted. First data can comprise a data asset such as content, content fragments, content segments, or the like. In an aspect, the first data can be transmitted to a first storage medium. As an example, the first storage medium can be disposed locally relative to a source of the request for transmission. Locally disposed can comprise integrated with the source of the request, located at the same premises, coupled via a local network, or the like. In another aspect, the first data can be transmitted based upon a first condition. As an example, the first condition can comprises available bandwidth, storage capacity, content priority, QoS, on-net or off-net state, recipient device characteristics, or a combination thereof. As a further example, when conditions allow the transmission of first data such as large data files (e.g., high definition video assets and the like), the first data can be routed to the first storage medium.

In step 604, second data can be transmitted. In an aspect, the second data can be transmitted to one or more of the first storage medium and a second storage medium. Second data can comprise a data asset such as content, content fragments, content segments, or the like. As an example, the second storage medium can be disposed remotely relative to a source of the request for transmission. Remotely disposed can comprise separated from the source of the request, located outside a premises housing the source of the request, coupled via a wide area network, or the like. As a further example, one or more of the first storage medium and the second storage medium can comprise a network storage medium. In another aspect, the second data can be transmitted based upon a second condition. As an example, one or more of the first condition and the second condition can comprises available bandwidth, storage capacity, content priority, QoS, on-net or off-net state, recipient device characteristics, or a combination thereof. As a further example, when conditions do not allow the transmission of first data such as large data files (e.g., high definition video assets and the like) to the first storage device, the second data can be transmitted instead of the first data. As yet a further example, the second data can be transmitted in addition to the first data.

In an aspect, one or more of the first data and the second data can comprise content fragments. As an example, one or more of the first data and the second data comprises, or have associated therewith, a bit rate, a resolution, or a combination thereof. As another example, the first data can comprise a bit rate or format that is different from a bit rate or format of the second data. As a further example, the first data can comprise a resolution that is different from a resolution of the second data.

In step 606, a manifest can be generated (e.g., created, populated, retrieved, updated, etc.). In an aspect, the manifest can comprise location information. As an example, the location information can relate to one or more of the first data and the second data. As a further example, the location information can relate to a storage location of one or more of the first data and the second data. As such, when the location of one or more of the first data and the second data is changed, the manifest can be modified to reflect the updated location of the one or more of the first data and the second data.

In step 608, a request for data can be accessed or received. In an aspect, the request for data can comprise a request for transmission of one or more of the first data and the second data. As an example, the request for data can be based upon the manifest. As a further example, the request for data can comprise requesting data from a particular location, such as a location comprised in the manifest. In another aspect, the manifest can be transmitted to a particular device, wherein the request for transmission is received from the particular device. In step 610, the requested data can be transmitted. In an aspect, the requested data can be transmitted to the requesting device.

Figure 7:
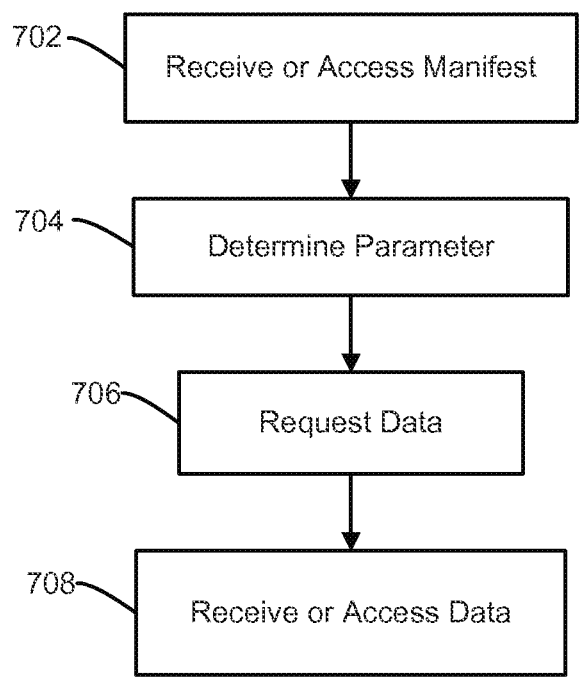
FIG. 7 is a flow chart of an example method.

FIG. 7 illustrates an exemplary method. In step 702, a manifest can be accessed or received. In an aspect, the manifest can comprise location information. As an example, the manifest can be received by a device, such as a user device. As a further example, the location information can relate to a first data stored locally relative to the user device and/or a second data stored remotely relative to the user device. Locally disposed can comprise integrated with the user device, located at the same premises, coupled via a local network, or the like. Remotely disposed can comprise separated from the user device, located outside a premises housing the user device, coupled via a wide area network, or the like. However, the first data and second data can be stored in any location.

In an aspect, one or more of the first data and the second data can comprise content fragments. As an example, one or more of the first data and the second data comprise, or have associated therewith, a bit rate, a resolution, or a combination thereof. As another example, the first data can comprise a bit rate that is different from a bit rate of the second data. As a further example, the first data can comprise a resolution that is different from a resolution of the second data.

In step 704, a parameter can be determined. In an aspect, the parameter can relate to the user device. As an example, the parameter can comprise available bandwidth, storage capacity, content priority, QoS, on-net or off-net state, recipient device characteristics, or a combination thereof.

In step 706, data can be requested. In an aspect, one or more of the first data and the second data can be requested. In another aspect, the request for one or more of the first data and the second data can be based upon one or more of the manifest and the determined parameter. As an example, when the determined parameter allows for transmission of high quality video, the first data can be requested. As a further example, the determined parameter limited the transmission of the first data, the second data can be requested.

In step 708, the requested data can be accessed or received. In an aspect, the requested data can be received by the requesting device.

Figure 8:
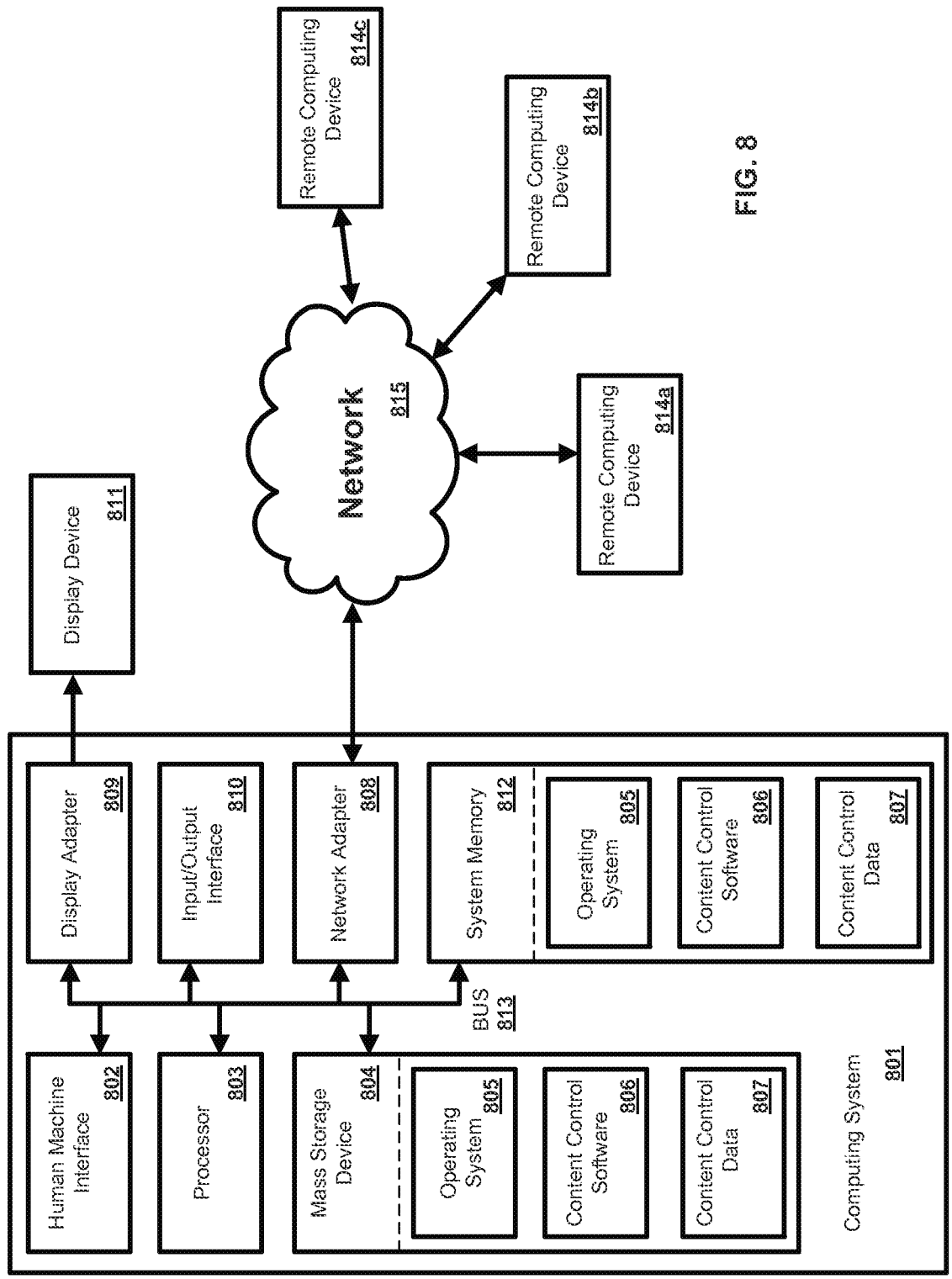
FIG. 8 is a block diagram of an example computing system.

In an exemplary aspect, the methods and systems can be implemented on a computing system 801 as illustrated in FIG. 8 and described below. By way of example, computing device 210, the user device 214, and/or the decision computing device 220 of FIG. 2 can be a computing system as illustrated in FIG. 8.

FIG. 8 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 801. The components of the computing system 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, content control software 806, content control data 807, a network adapter 808, system memory 812, an Input/Output Interface 810, a display adapter 809, a display device 811, and a human machine interface 802, can be contained within one or more remote computing devices 814*a, b, c* at physically separate locations, connected through buses of this form, in effect implementing a fully distributed system.

The computing system 801 typically comprises a variety of computer readable media. Exemplary readable media can be any available media that is accessible by the computing system 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as content control data 807 and/or program modules such as operating system 805 and content control software 806 that are immediately accessible to and/or are presently operated on by the processing unit 803.

In another aspect, the computing system 801 can also comprise other removable/non-removable, volatile/non-volatile computer storage media. By way of example, FIG. 8 illustrates amass storage device 804 which can provide non-volatile storage of computer code, computer readable instructions, data structures, program modules, and other data for the computing system 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and content control software 806. Each of the operating system 805 and content control software 806 (or some combination thereof) can comprise elements of the programming and the content control software 806. Content control data 807 can also be stored on the mass storage device 804. Content control data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 807 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing system 801 can have more than one display adapter 809 and the computing system 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computing system 801 via Input/Output Interface 810. Any step and/or result of the methods can be output in any form to an output device. Such output can be any form of visual representation, including, but not limited to, textual, graphical, animation, audio, tactile, and the like. The display 811 and computing system 801 can be part of one device, or separate devices.

The computing system 801 can operate in a networked environment using logical connections to one or more remote computing devices 814*a, b, c*. By way of example, a remote computing device can be a personal computer, portable computer, smartphone, a server, a router, a network computer, a peer device or other common network node, and so on. Logical connections between the computing system 801 and a remote computing device 814*a, b, c* can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing system 801, and are executed by the data processor(s) of the computer. An implementation of content control software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   sending, to a user device, to be stored locally via a storage medium of the user device, a version of a content item;
   sending, to a plurality of storage devices, to be stored by the plurality of storage devices, a different version of the content item; and
   sending, to the user device, a manifest, wherein the manifest comprises location information associated with the version of the content item and location information associated with the different version of the content item, wherein the manifest comprises a cost function, wherein a calculation of the cost function causes the user device to request at least a portion of the different version of the content item from a storage device of the plurality of storage devices and access at least a portion of the version of the content item via the storage medium of the user device.

2. The method of claim 1, wherein a difference between the version of the content item and the different version of the content item is based on at least one of: a bit rate or a resolution.

3. The method of claim 1, further comprising:
   determining that at least one storage device of the plurality of storage devices does not store the different version of the content item; and
   updating, based on determining that the at least one storage device does not store the different version of the content item, the manifest.

4. The method of claim 3, further comprising sending, to the user device, the updated manifest.

5. The method of claim 1, wherein sending the version of the content item comprises sending a plurality of portions of the content item to the user device to be stored locally in the storage medium.

6. The method of claim 1, wherein sending the different version of the content item comprises sending each storage device of the plurality of storage devices a plurality of portions of the content item to be stored by the storage device.

7. The method of claim 1, further comprising receiving, from the user device, based on the manifest and the calculation, the request for the at least a portion of the different version of the content item.

8. A method comprising:
   storing, by a user device, in a storage medium of the user device, a version of a content item; and
   receiving a manifest, wherein the manifest comprises a cost function and location information associated with a different version of the content item, wherein a calculation of the cost function causes the user device to access at least a portion of the version of the content item from the storage medium of the user device and request at least a portion of the different version of the content item from a storage device of a plurality of storage devices that store the different version of the content item.

9. The method of claim 8, wherein a difference between the version of the content item and the different version of the content item is based on at least one of: a bit rate or a resolution.

10. The method of claim 8, wherein receiving the manifest comprises receiving the manifest from a network device.

11. The method of claim 8, further comprising accessing, based on the calculation of the cost function, the at least a portion of the version of the content item via the storage medium of the user device.

12. The method of claim 8, further comprising requesting, based on the calculation of the cost function, the at least a portion of the different version of the content item from the storage device of the plurality of storage devices.

13. The method of claim 8, further comprising receiving, based on the storage device of the plurality of storage devices no longer storing the different version of the content item, an updated manifest.

14. An apparatus comprising:
   one or more processors; and
   memory storing processor-executable instructions that, when executed by the one or more processors, cause the apparatus to:
      send, to a user device, to be stored locally via a storage medium of the user device a version of a content item;
      send, to a plurality of storage devices, to be stored by the plurality of storage devices, a different version of the content item; and
      send, to the user device, a manifest, wherein the manifest comprises location information associated with the version of the content item and location information associated with the different version of the content item, wherein the manifest comprises a cost function, wherein a calculation of the cost function causes the user device to request at least a portion of the different version of the content item from a storage device of the plurality of storage devices and access at least a portion of the version of the content item via the storage medium of the user device.

15. The apparatus of claim 14, wherein a difference between the version of the content item and the different version of the content item is based on at least one of: a bit rate and a resolution.

16. The apparatus of claim 14, wherein the processor-executable instructions that, when executed by the one or more processors, cause the apparatus to send the version of the content item, cause the apparatus to send at least a portion of a plurality of portions of the content item to the user device to be stored locally in the storage medium.

17. The apparatus of claim 14, wherein the processor-executable instructions that, when executed by the one or more processors, cause the apparatus to send the different version of the content, cause the apparatus to send each storage device of the plurality of storage devices at least a portion of a plurality of portions of the content item to be stored by the storage device.

18. The apparatus of claim 14, wherein the processor-executable instructions, when executed by the one or more processors, further cause the apparatus to receive, from the user device, based on the manifest and the calculation, the request for the at least a portion of the different version of the content item.

19. The apparatus of claim 14, wherein the processor-executable instructions, when executed by the one or more processors, further cause the apparatus to:
  determine that at least one storage device of the plurality of storage devices does not store the different version of the content item; and
  update, based on determining that the at least one storage device does not store the different version of the content item, the manifest.

20. The apparatus of claim 19, wherein the processor-executable instructions, when executed by the one or more processors, further cause the apparatus to send, to the user device, the updated manifest.

* * * * *